United States Patent [19]

Antoine

[11] 4,006,282
[45] Feb. 1, 1977

[54] SEAL ARRANGEMENT FOR A LEAD TERMINAL WITH THE COVER OF A STORAGE CELL

[75] Inventor: Sipic Antoine, St. Jean de Braye, France

[73] Assignees: Saft-Societe des Accumulateurs Fixes et de Traction, Romainville; Compagnie Europeenne d'Accumulateurs, Paris, both of France

[22] Filed: Dec. 15, 1975

[21] Appl. No.: 640,550

[30] Foreign Application Priority Data

Oct. 22, 1975 France .................... 75.32300

[52] U.S. Cl. .................................................. 429/181
[51] Int. Cl.² ........................................... H01M 2/06
[58] Field of Search ........... 136/135, 168; 429/178, 429/181, 174, 185

[56] References Cited

UNITED STATES PATENTS

| 1,714,467 | 5/1929 | Dunn | 136/168 |
| 3,704,173 | 11/1972 | McClelland et al. | 136/135 R |
| 3,839,093 | 10/1974 | Twogood et al. | 136/168 |

*Primary Examiner*—Donald L. Walton
*Attorney, Agent, or Firm*—Kenyon & Kenyon Reilly Carr & Chapin

[57] ABSTRACT

Seal in the cover of a storage cell for a malleable metal terminal post such as lead or indium terminal post provided with a blind hole opening towards the outside and a shoulder inside the storage cell. A flexible gasket is situated between the cover and the shoulder. An expandable rivet or the like is inserted in the blind hole and has a head that bears on the external face of the cover. Extraction of the rivet expands and shortens the terminal post and compresses the flexible gasket into sealing relationship between the shoulder and the cover without causing the expanded portion of the terminal post to come into contact with the cover thus avoiding danger of cracking the latter. Application is to small sealed lead storage cells.

12 Claims, 4 Drawing Figures

SEAL ARRANGEMENT FOR A LEAD TERMINAL WITH THE COVER OF A STORAGE CELL

RELATED APPLICATIONS

No related applications are copending.

BACKGROUND AND BRIEF SUMMARY OF INVENTION

The present invention relates to arrangement for sealing of terminal posts in the covers of lead-acid storage cells and applies more particularly but not exclusively to the case where the material of that cover has a certain rigidity rendering it likely to damage when sealing is effected.

There exist numerous devices intended for effecting the sealing of terminals of lead-acid storage cells and in his work on "Storage Batteries" G. W. Vinyl discloses various types thereof. Among these, some use a sealing compound poured in a groove provided for that purpose. Others rely on the compressing of a flexible gasket obtained by screwing of a nut, the gasket being compressed between the cover and the nut, or between the cover and a shoulder of the terminal post is drawn upwards by the screwing of the nut.

More recently — and this applies more particularly to storage cells having small dimensions, sealing was obtained by cold flow of the material of the terminal itself, taking advantage of the malleable qualities of lead, or sometimes, of indium. That cold flow can be obtained by increasing of the diameter of the terminal by the insertion, in a bore provided at the centre of the terminal, of a part such as a screw or a rod which is at least partly conical, having a maximum diameter greater than the inside diameter of the bore. That part can also consist of an expandable rivet.

The material of the terminal is thus compressed against the cover. However, this compression provides good sealing only if the cover is made of a flexible material. If the material of the cover is rigid, besides the fact that the contact between the terminal and the cover is not really fluid-tight, the increase of the diameter of the terminal risks causing a cracking of the cover.

This invention aims at remedying these drawbacks.

It has, among its objects, a seal in the cover of a lead-acid storage cell for a lead terminal post provided with a shoulder on the portion situated inside the storage cell and a blind hole opening towards the outside, in which is arranged a part such as a screw or an expandable rivet whose head bears on the outer surface of the cover, a flexible gasket being situated between the cover and the shoulder of the terminal post, characterized in that the action of the said part compresses the flexible gasket between the shoulder and the cover without however the contingent expansion of the lead terminal under the action of the said part effecting any contact between the cover and the expanded portion.

In this way, sealing is obtained simply by the compression of the flexible gasket without having to resort to a threading and a bulky nut and without having to fear a compression of the material against the cover which could effect a cracking thereof since the expanded portion of the terminal post does not even come into contact with the cover. Sealing is obtained exclusively at the level of the flexible gasket which is compressed either by the shortening of the expandable rivet or by the action of the screw.

The invention will be better understood from the following example in relation with the accompanying drawings in which.

DETAILED DESCRIPTION

Figure 1:
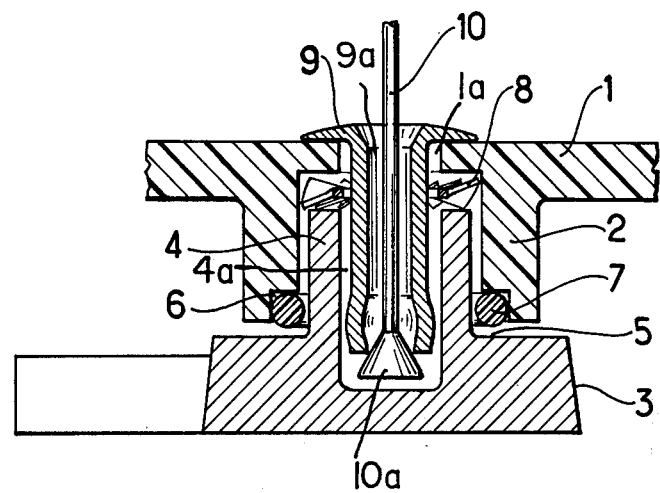
FIG. 1 shows a cross-section of an embodiment of the terminal post sealing arrangement according to the invention before final assembly.
Figure 2:
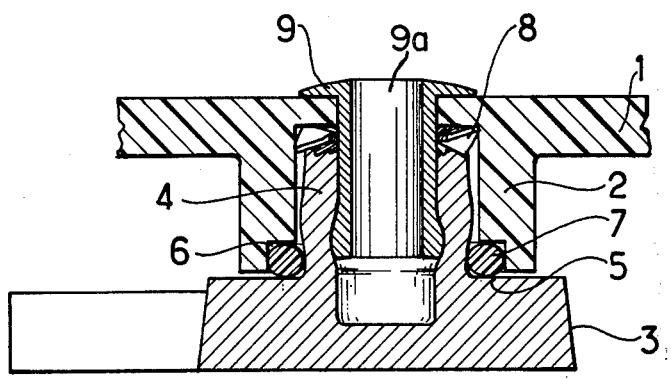
FIG. 2 shows a cross-section of the same embodiment after the final assembly.

In FIGS. 1 and 2, the reference numeral 1 designates the cover of the storage cell, made of rigid plastic material such as polystyrene.

An orifice 1a is formed in the cover and limited laterally by an inwardly extending cylindrical skirt 2 which is integral with and is part of the cover 1. The group of cell plates 3 corresponding to that orifice is overtapped by a terminal post 4 of lead, indium or other malleable metal in which a blind hole 4a is drilled. The terminal post forms a shoulder 5 which underlies an annular recess 6 formed in the inner wall of the skirt 2. A flexible gasket 7 having a toroidal shape is located in said recess and in contact with shoulder 5.

A notched or serrated washer 8 is positioned between the top of the terminal post 4.

An headed expandable hollow rivet 9 provided with a pin 10, as in FIG. 1, is positioned in the blind hole of the terminal post 4. This pin 10 has a conical head 10a whose largest diameter exceeds that of the unexpanded diameter of rivet 9.

It will be seen, in FIG. 1, that the gasket 7 is not compressed in its recess when the rivet is unexpanded and that the expandable rivet 9 in its non-expanded state does not fill the blind hole.

However, when the pin 10 is withdrawn from the expandable rivet by a suitable tool, its conical head 10a passes upwardly through the bore 9a of the rivet 9 and forces the body thereof against the inner walls of the blind hole 4a to such an extent that it causes the expanded part of said rivet situated at the base of the latter to penetrate said inner walls. The widening of the rivet also causes a shortening thereof and the terminal post is thus drawn upwards, compressing on the one hand the notched or serrated washer 8 between the top of the terminal in which it becomes slightly embedded and likewise into the cover, and on the other hand, the gasket 7 is simultaneously compressed between the terminal post, the walls of the recess 6 and the shoulder 5 (which latter does not quite come into contact with the base of the skirt 2, because of the presence of that gasket 7).

Sealing is, therefore, provided at the level of the gasket 7 so that the top end portion of the terminal post and especially of the body of rivet 9 and of the notched washer 8 are completely sheltered from acid splashes. Moreover, since the notched washer becomes slightly embedded into the end of the terminal post it ensures its centering and prevents any rotational movement of the latter. The original dimensions of the terminal post 4 are calculated in such a way that even at the location thereof that is widened by the spreading action of the rivet 9, it does not come into contact with the skirt 7 of the cover and consequently does not exercise any pressure which could effect its cracking. The upward compression also is partly absorbed by the compressive deformation of the washer 8.

Figure 3:
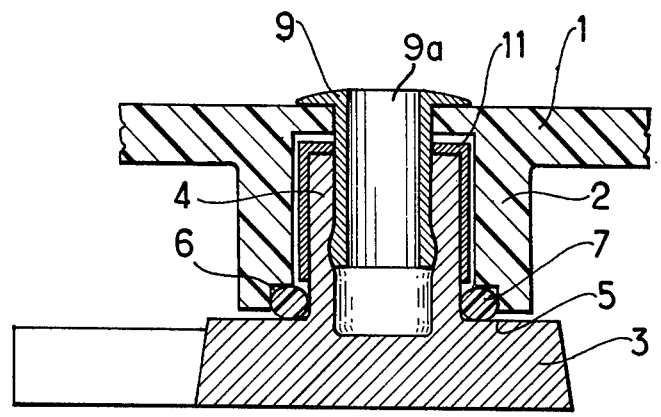
FIG. 3 shows a cross-section of another embodiment according to the invention.

FIG. 3, wherein parts corresponding to like parts in FIGS. 1 and 2 are similarly numbered, shows an embodiment in which the washer 8 has been replaced by a ring 11 having an L-shaped cross-section, made of non-deformable metal. The cylindrical portion of this ring limits the diametrical expansion of the terminal post 4 under the influence of the expandable rivet 9 and prevents it from coming into contact with the skirt 2. The plane portion of this ring 11 lies on the top end of the terminal post 4.

Figure 4:
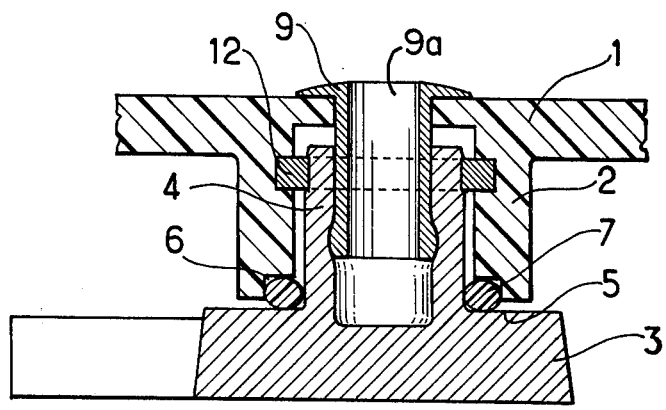
FIG. 4 shows a cross-section of a third embodiment according to the invention.

In FIG. 4, wherein parts corresponding to like parts in FIGS. 1 and 2 are similarly numbered, the centering of the terminal post 4 is effected by a ring 12 which has been inserted into the skirt 2 of the cover 1 at the time of the molding of the latter.

The methods and means for positioning the rivet and expanding of the latter are otherwise entirely similar to that shown in FIGS. 1 and 2 and as described with respect thereto.

It must be understood that the invention is not limited to the examples which have just been described. Variations within the scope of the claims are possible. For example, the expandable rivet 9 could, in all the described embodiments, be replaced by a screw threadedly entering the hole of the terminal post 4 and whose head rests on the cover 1. The screwing insertion of the screw draws the terminal post upwards while expanding it and thus compresses the gasket 7.

What is claimed is:

1. Seal in the cover of a lead-acid storage cell comprising a terminal post of malleable metal having a shoulder on the portion of said post situated inside the storage cell and a blind hole in said terminal post opening toward the outside, an expanded headed part whose head bears on the cover, a flexible gasket situated between a portion of the cover and the shoulder of the terminal post, said expanded part acting to expand a portion of said post and also resulting in compression of the flexible gasket between the shoulder and the cover without, however, having the resultant expansion of the terminal post under the action of the said expanded part cause contact between the portion of said cover and the expanded portion of said post.

2. Seal according to claim 1, including a ring for centering the terminal post at the time of expansion in assembly.

3. Seal according to claim 2, wherein said ring is positioned on the top of the terminal post and has a serrated shape.

4. Seal according to claim 2, wherein the said ring has an L-shaped cross-section, its cylindrical portion surrounding the terminal post and its plane portion lying on the top end of the terminal post.

5. Seal according to claim 2, wherein the ring is partly embedded in the material of the cover with a protruding portion, said protruding portion serving to center the said terminal post.

6. Sealing device for a storage cell comprising a cover having an opening and a cylindrical skirt, a terminal post of malleable metal extending into said skirt and having a smaller external diameter than the inner diameter of said skirt, said post having a shoulder and also a blind hole opening upwardly toward the under face of said cover, an expanded headed part positioned in said hole with its head bearing on the outer face of said cover, a recess in said skirt adjacent its inner and, a flexible gasket positioned in said recess and engaged by said shoulder, the expansion of said expanded part effecting expansion of a portion of said terminal post and effecting sealing compression of said flexible gasket between said shoulder and walls of said recess without, however, causing resultant expansion of said terminal post into contact with the inner wall of said skirt.

7. Sealing device according to claim 6 including means for centering said post in said skirt.

8. Sealing device according to claim 6 including means for centering said post in said skirt, said means comprising a ring-like member.

9. Sealing device according to claim 8 wherein said ring-like member is serrated.

10. Sealing device according to claim 8 wherein said ring-like member has L-shaped section.

11. Sealing device according to claim 6 including means for centering said post in said skirt comprising a ring partially embedded in said skirt.

12. A device for effecting sealing for a storage cell comprising a cover having an opening and a cylindrical skirt, a terminal post of malleable metal extending into said skirt and having a smaller external diameter than the inner diameter of said skirt, said post having a shoulder and also a blind hole opening upwardly toward the underface of said cover, an expandable headed part positioned in said hole with its head bearing on the outer face of said cover, a recess in said skirt adjacent to its inner end, a flexible gasket positioned in said recess and engaged by said shoulder, and means for expanding said expandable part to effect expansion of a portion of said terminal post and cause sealing compression of said flexible gasket between said shoulder and walls of said recess, without, however, causing resultant expansion of said terminal post into contact with the inner wall of said skirt, said means for expanding said expandable part comprising a withdrawable pin mounted in said part, said pin having a conical head whose largest diameter exceeds the inner diameter of said expandable part and which on withdrawal of said pin passes through said part and effects expansion thereof.

* * * * *